United States Patent
Isobe et al.

(10) Patent No.: US 10,766,387 B2
(45) Date of Patent: Sep. 8, 2020

(54) CONVEYANCE SEAT MANUFACTURING METHOD AND CONVEYANCE SEAT

(71) Applicant: TS TECH CO., LTD., Saitama (JP)

(72) Inventors: Ryuji Isobe, Tochigi (JP); Shinichiro Motoda, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 60 days.

(21) Appl. No.: 16/039,437

(22) Filed: Jul. 19, 2018

(65) Prior Publication Data

US 2019/0023162 A1   Jan. 24, 2019

(30) Foreign Application Priority Data

Jul. 19, 2017  (JP) .................. 2017-139931

(51) Int. Cl.
| | |
|---|---|
| *B60N 2/58* | (2006.01) |
| *B62J 1/18* | (2006.01) |
| *B62J 1/12* | (2006.01) |
| *B63B 29/04* | (2006.01) |
| *B62J 1/00* | (2006.01) |
| *B64D 11/06* | (2006.01) |

(52) U.S. Cl.
CPC ......... *B60N 2/5891* (2013.01); *B60N 2/5866* (2013.01); *B62J 1/12* (2013.01); *B62J 1/18* (2013.01); *B62J 1/00* (2013.01); *B63B 29/04* (2013.01); *B63B 2029/043* (2013.01); *B64D 11/0647* (2014.12)

(58) Field of Classification Search
CPC ......... B60N 2/5891; B60N 2/5866; B62J 1/18
See application file for complete search history.

(56) References Cited

U.S. PATENT DOCUMENTS

| | | | | |
|---|---|---|---|---|
| 6,345,865 B1* | 2/2002 | Ashida | ....................... | B62J 1/00 |
| | | | | 297/195.1 |
| 9,027,992 B2* | 5/2015 | Kawatani | ................... | B62J 1/12 |
| | | | | 297/195.12 |
| 2006/0232111 A1* | 10/2006 | Hasegawa | ........... | B29C 33/3814 |
| | | | | 297/219.11 |

FOREIGN PATENT DOCUMENTS

| | | | | |
|---|---|---|---|---|
| EP | 2075178 A2 | * | 7/2009 | ................ B62J 1/12 |
| JP | 02078529 A | * | 3/1990 | |
| JP | 2003-146272 A | | 5/2003 | |
| JP | 2004231125 A | * | 8/2004 | |

* cited by examiner

*Primary Examiner* — David R Dunn
*Assistant Examiner* — Tania Abraham
(74) *Attorney, Agent, or Firm* — Michael Best & Friedrich LLP

(57) ABSTRACT

An improved conveyance seat is configured by an overlapping part of a skin material being hung in a recessed portion formed at a boundary position between a support portion and an intersecting portion of the cushion material when the cushion material divided into pieces is covered by the skin material having the overlapping part configured by two skin material fragments overlapping each other. The skin material fragments inserted into the recessed portion have first and second parts satisfying the following conditions: (1) The first parts are welded to contact each other on a back side of the recessed portion behind an opening of the recessed portion and parts of the first parts are crushed, (2) The second parts adjacent to the first parts and closer to the opening of the recessed portion than the first parts are separated from each other.

15 Claims, 12 Drawing Sheets

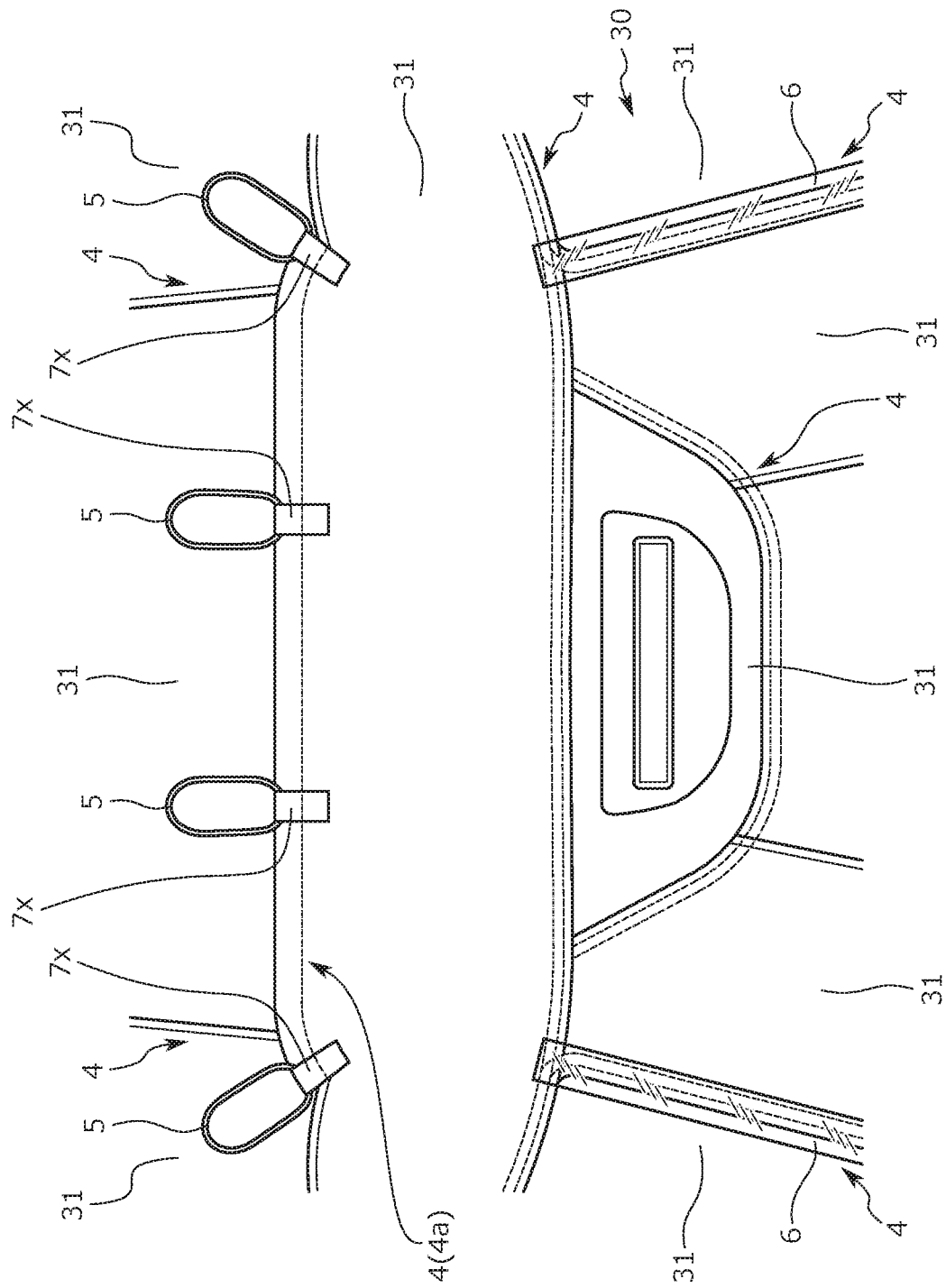

CONVEYANCE SEAT MANUFACTURING METHOD AND CONVEYANCE SEAT

CROSS-REFERENCE TO RELATED APPLICATIONS

The present application is based upon and claims the benefit of priority from Japanese Application Number 2017-139931, filed on Jul. 19, 2017, the entire contents of which are incorporated herein by reference.

BACKGROUND OF THE INVENTION

Field of the Invention

The present invention relates to a conveyance seat manufacturing method and a conveyance seat and, more particularly, to a method for manufacturing a conveyance seat having a configuration in which a cushion material is covered by a skin material having an overlapping part configured by two skin material fragments overlapping each other and a conveyance seat manufactured by the manufacturing method.

Description of the Related Art

In some conveyance seats with a cushion material covered by a skin material, the skin material has an overlapping part configured by two skin material fragments overlapping each other. In other words, a plurality of skin material fragments are joined to constitute a single skin material.

A cushion material is provided with a support portion supporting a seated person's buttocks and an intersecting portion intersecting with the support portion at a position next to the support portion. When the cushion material is covered with the skin material described above, the overlapping part of the skin material may be hung in a recessed portion formed at a boundary position between the support portion and the intersecting portion in the cushion material.

In the conveyance seat (two-wheeled vehicle seat to be specific) that is disclosed in JP 2003-146272 A, the overlapping part of the skin material is hung in the recessed portion (long hole to be specific). The overlapping part wraps around to the back side of a bottom plate and is fixed to the back surface of the bottom plate by a tacker or the like. In addition, in the conveyance seat disclosed in JP 2003-146272 A, the overlapping part hung in the recessed portion is configured by a plurality of skin material fragments being joined by suturing and welder welding.

The overlapping part hung in the recessed portion needs to be configured such that the final quality of the seat is improved. Specifically, it is desirable that a satisfactory appearance (look) is ensured when the overlapping part is hung in the recessed portion and rainwater or the like is unlikely to accumulate in the space in the recessed portion in which the overlapping part is hung.

SUMMARY OF THE INVENTION

The present invention has been made in view of the above-described problems, and an object thereof is to provide a conveyance seat manufacturing method by which a conveyance seat is manufactured by an overlapping part of a skin material being hung in a recessed portion of a cushion material and the quality of the seat can be improved.

According to a method for manufacturing a conveyance seat of the present invention, the above-described problems are solved by preparing a cushion material divided into a first cushion material piece having a support portion supporting a seated person's buttocks and a second cushion material piece having an intersecting portion intersecting with the support portion at a position next to the support portion, a recessed portion being formed at a boundary position between the support portion and the intersecting portion in the cushion material, preparing a skin material having an overlapping part configured by two skin material fragments overlapping each other, covering the cushion material by the skin material such that the overlapping part is inserted into the recessed portion, and forming the overlapping part inserted into the recessed portion such that each of the two skin material fragments constituting the overlapping part has a first part satisfying the following condition (1) and a second part satisfying the following condition (2): (1) The respective first parts of the two skin material fragments being welded to be in contact with each other on a back side of the recessed portion behind an opening of the recessed portion and parts of the respective first parts of the two skin material fragments being crushed, (2) The respective second parts in the two skin material fragments being adjacent to the first parts at positions closer to the opening of the recessed portion than the first parts and the second parts being separated from each other such that a gap between the second parts decreases as the first part is approached.

According to the above-described method, the overlapping part of the skin material inserted into the recessed portion is configured by welding and joining of the two skin material fragments constituting the overlapping part. In addition, in the above-described method, each of the two skin material fragments constituting the overlapping part inserted into the recessed portion has the first part satisfying the condition (1) above and the second part satisfying the condition (2) above. In other words, the two skin material fragments constituting the overlapping part inserted into the recessed portion are welded at the partially crushed first parts and are separated from each other such that the gap between the skin material fragments decreases as the first part is approached at the second parts adjacent to the first parts.

Once the overlapping part that the two skin material fragments constitute is inserted into the recessed portion through the above-described procedure, the overlapping part becomes satisfactory (specifically, the gap between the two skin material fragments constituting the overlapping part inserted into the recessed portion becomes relatively narrow) and rainwater or the like is unlikely to accumulate in the space in the recessed portion into which the overlapping part is inserted. As a result, the quality of the conveyance seat as a final product is improved.

In the method for manufacturing a conveyance seat described above, the cushion material may be covered by the skin material such that the respective first parts of the two skin material fragments constituting the overlapping part inserted into the recessed portion are closer to the opening than a middle of the recessed portion in a depth direction of the recessed portion.

In the above-described method, the overlapping part has a relatively shallow position when inserted into the recessed portion. As a result, the yield of the skin material can be improved compared to a case where the overlapping part is inserted up to the deep portion in the recessed portion. In addition, rainwater or the like is unlikely to accumulate in the space in the recessed portion into which the overlapping part is inserted.

In the method for manufacturing a conveyance seat described above, the overlapping part disposed at a position next to an end portion of the overlapping part of the skin material inserted into the recessed portion may be formed such that each of the two skin material fragments constituting the overlapping part has a third part satisfying the following condition (3): (3) The respective third parts of the two skin material fragments being welded to be in contact with each other and a molten material of the third part being formed at a position of a place where the third parts are in contact with each other.

In the above-described method, the overlapping part including the two skin material fragments having the third parts satisfying the condition (3) above is provided at the position next to the end portion of the overlapping part of the skin material inserted into the recessed portion. As a result, unevenness attributable to the formation of the overlapping part is suppressed at both side positions of the overlapping part of the skin material inserted into the recessed portion, and strength is sufficiently ensured at the overlapping part.

In the method for manufacturing a conveyance seat described above, the cushion material may be placed on a base material and the two skin material fragments constituting the overlapping part inserted into the recessed portion may be sutured at a part closer to the base material than the opening of the recessed portion in a state where the overlapping part is inserted into the recessed portion.

In the above-described method, the part of the overlapping part inserted into the recessed portion that is closer to the deep portion of the recessed portion is sutured, and thus the strength of the part can be improved.

In the method for manufacturing a conveyance seat described above, the overlapping part inserted into the recessed portion may extend along a width direction of the conveyance seat and the cushion material may be covered by the skin material such that an end portion of the overlapping part in the width direction is inserted into the recessed portion.

In the above-described method, the seat-width-direction end portion of the overlapping part inserted into the recessed portion is inserted into the recessed portion. As a result, a satisfactory conveyance seat appearance is obtained in the width-direction end portion of the overlapping part inserted into the recessed portion.

In the method for manufacturing a conveyance seat described above, the overlapping part inserted into the recessed portion may extend along a width direction of the conveyance seat and the overlapping part inserted into the recessed portion may be wrapped in a tarpaulin molded to have the same length as the overlapping part inserted into the recessed portion in the width direction.

In the above-described method, the overlapping part inserted into the recessed portion is wrapped in the tarpaulin molded to have the same length as the overlapping part, and thus the strength of the overlapping part can be improved. In addition, since the tarpaulin has the same length as the overlapping part, tarpaulin attachment work is easier than in a case where a fragmented tarpaulin is intermittently attached to the overlapping part.

In the method for manufacturing a conveyance seat described above, a linear member for hanging the overlapping part may be attached to the overlapping part inserted into the recessed portion and the overlapping part inserted into the recessed portion may be wrapped in the tarpaulin in which a hole for passing the linear member is formed.

In the above-described method, the linear member passes through the hole formed in the tarpaulin, and thus the tarpaulin does not have to be fragmented for linear member attachment. Accordingly, the effect of tarpaulin-based improvement of the strength of the overlapping part inserted into the recessed portion is appropriately demonstrated. In addition, since the overlapping part is inserted into the recessed portion with the strength thereof improved by the tarpaulin, creasing in the periphery of the overlapping part is suppressed and the overlapping part is appropriately inserted into the recessed portion.

In the method for manufacturing a conveyance seat described above, the overlapping part inserted into the recessed portion may extend along a width direction of the conveyance seat and the cushion material may be covered by the skin material such that a plurality of parts of the overlapping part inserted into the recessed portion different in position from one another in the width direction are hung in the recessed portion.

In the above-described method, the plurality of parts of the overlapping part in the seat width direction are hung in the recessed portion when the overlapping part is inserted into the recessed portion. As a result, the overlapping part is inserted into the recessed portion in a balanced manner, and thus a satisfactory seat appearance is obtained.

In the method for manufacturing a conveyance seat described above, the cushion material may be covered by the skin material such that the overlapping part inserted into the recessed portion heads rearward and downward as the overlapping part is inserted to the back side of the recessed portion.

In the above-described method, the overlapping part inserted into the recessed portion is inserted into the recessed portion such that the overlapping part heads rearward and downward as the overlapping part is inserted to the back side of the recessed portion. Once the cushion material is covered by the skin material in this manner, creasing of the skin material is unlikely to occur in the periphery of the recessed portion when a conveyance occupant is seated on the conveyance seat.

In the method for manufacturing a conveyance seat described above, the overlapping part disposed to intersect with an end portion of the overlapping part of the skin material inserted into the recessed portion may be formed such that each of the two skin material fragments constituting the overlapping part has a fourth part satisfying the following condition (4) and a fifth part satisfying the following condition (5): (4) The respective fourth parts of the two skin material fragments being welded to be in contact with each other and parts of the respective fourth parts of the two skin material fragments being crushed, (5) The respective fifth parts in the two skin material fragments being adjacent to the fourth parts and the fifth parts being separated from each other such that a gap between the fifth parts decreases as the fourth part is approached.

In the above-described method, the overlapping part including the two skin material fragments having the fourth parts satisfying the condition (4) above and the fifth parts satisfying the condition (5) above is provided in the place intersecting with the end portion of the overlapping part of the skin material inserted into the recessed portion. As a result, the stress that is applied to the skin material in the periphery of the recessed portion is dispersed, creasing of the skin material in the periphery of the recessed portion is suppressed, and thus a satisfactory seat appearance is obtained.

In addition, according to a conveyance seat of the present invention, the above-described problems are solved with the conveyance seat including a cushion material divided into a first cushion material piece having a support portion supporting a seated person's buttocks and a second cushion material piece having an intersecting portion intersecting with the support portion at a position next to the support portion, a recessed portion being formed at a boundary position between the support portion and the intersecting portion in the cushion material and a skin material having an overlapping part configured by two skin material fragments overlapping each other, in which the cushion material is covered by the skin material in a state where the overlapping part is inserted into the recessed portion and the overlapping part inserted into the recessed portion is formed such that each of the two skin material fragments constituting the overlapping part has a first part satisfying the following condition (1) and a second part satisfying the following condition (2): (1) The respective first parts of the two skin material fragments being in contact with each other on a back side of the recessed portion behind an opening of the recessed portion and parts of the respective first parts of the two skin material fragments being crushed, (2) The respective second parts in the two skin material fragments being adjacent to the first parts at positions closer to the opening of the recessed portion than the first parts and the second parts being separated from each other such that a gap between the second parts decreases as the first part is approached.

With the conveyance seat according to the present invention configured as described above, the overlapping part inserted into the recessed portion becomes satisfactory (specifically, the gap between the two skin material fragments constituting the overlapping part becomes relatively narrow) and rainwater or the like is unlikely to accumulate in the space in the recessed portion into which the overlapping part is inserted. As a result, the quality of the conveyance seat as a final product is improved.

According to the method for manufacturing a conveyance seat of the present invention, the overlapping part of the skin material inserted into the recessed portion becomes satisfactory (specifically, the gap between the two skin material fragments constituting the overlapping part becomes relatively narrow) and rainwater or the like is unlikely to accumulate in the space in the recessed portion into which the overlapping part is inserted.

In addition, according to the method for manufacturing a conveyance seat of the present invention, the overlapping part has a relatively shallow position when inserted into the recessed portion, and thus the yield of the skin material is improved and rainwater or the like is unlikely to accumulate in the space in the recessed portion into which the overlapping part is inserted.

In addition, according to the method for manufacturing a conveyance seat of the present invention, unevenness attributable to the formation of the overlapping part is suppressed at both side positions of the overlapping part of the skin material inserted into the recessed portion, and strength is sufficiently ensured at the overlapping part.

In addition, according to the method for manufacturing a conveyance seat of the present invention, the part of the overlapping part inserted into the recessed portion that is closer to the deep portion of the recessed portion is sutured, and thus the strength of the part is improved.

In addition, according to the method for manufacturing a conveyance seat of the present invention, a satisfactory conveyance seat appearance is obtained in the width-direction end portion of the overlapping part inserted into the recessed portion.

In addition, according to the method for manufacturing a conveyance seat of the present invention, the strength of the overlapping part inserted into the recessed portion can be improved by the tarpaulin molded to have the same length as the overlapping part. Furthermore, tarpaulin attachment work is facilitated.

In addition, according to the method for manufacturing a conveyance seat of the present invention, the effect of tarpaulin-based improvement of the strength of the overlapping part inserted into the recessed portion is appropriately demonstrated. In addition, creasing in the periphery of the overlapping part inserted into the recessed portion can be suppressed.

In addition, according to the method for manufacturing a conveyance seat of the present invention, the overlapping part is inserted into the recessed portion in a balanced manner, and thus a satisfactory seat appearance is obtained.

In addition, according to the method for manufacturing a conveyance seat of the present invention, the cushion material can be appropriately covered by the skin material such that creasing of the skin material is unlikely to occur in the periphery of the recessed portion when a conveyance occupant is seated on the conveyance seat.

In addition, according to the method for manufacturing a conveyance seat of the present invention, the stress that is applied to the skin material in the periphery of the recessed portion can be dispersed and creasing of the skin material in the periphery of the recessed portion can be effectively suppressed.

In addition, with the conveyance seat according to the present invention, the overlapping part of the skin material inserted into the recessed portion becomes satisfactory (specifically, the gap between the two skin material fragments constituting the overlapping part inserted into the recessed portion becomes relatively narrow) and rainwater or the like is unlikely to accumulate in the space in the recessed portion into which the overlapping part is inserted.

BRIEF DESCRIPTION OF THE DRAWINGS

FIG. 14 is a diagram illustrating a tarpaulin attachment structure according to a modification example.

DETAILED DESCRIPTION

Hereinafter, a conveyance seat and a method for manufacturing the conveyance seat according to an embodiment of the present invention (the present embodiment) will be described. The following embodiment is to facilitate the understanding of the present invention and does not limit the present invention. In other words, the present invention can be changed and improved without deviating from the purpose of the present invention and it is a matter of course that equivalents thereof are included in the present invention.

A motorcycle seat (hereinafter, referred to as a two-wheeled vehicle seat S) will be described below as an example of the conveyance seat. However, the present invention is also applicable to the conveyance seats of non-motorcycle conveyances such as motor tricycles, four-wheeled vehicles such as passenger cars, ships, and aircraft.

In the following description, the "front to back direction" corresponds to the front to back direction of the two-wheeled vehicle seat S and the traveling direction of a motorcycle. In addition, the "width direction" corresponds to the width direction (breadth direction) of the two-wheeled vehicle seat S and the right to left direction seen from an occupant seated on the two-wheeled vehicle seat S.

Unless otherwise noted, the following description of the position and the state of each part constituting the two-wheeled vehicle seat S assumes a case where the motorcycle on which the two-wheeled vehicle seat S is mounted is in an upright state (inclined neither to the right nor to the left) on a horizontal plane.

Configuration of Two-Wheeled Vehicle Seat According to Present Embodiment

Figure 1:
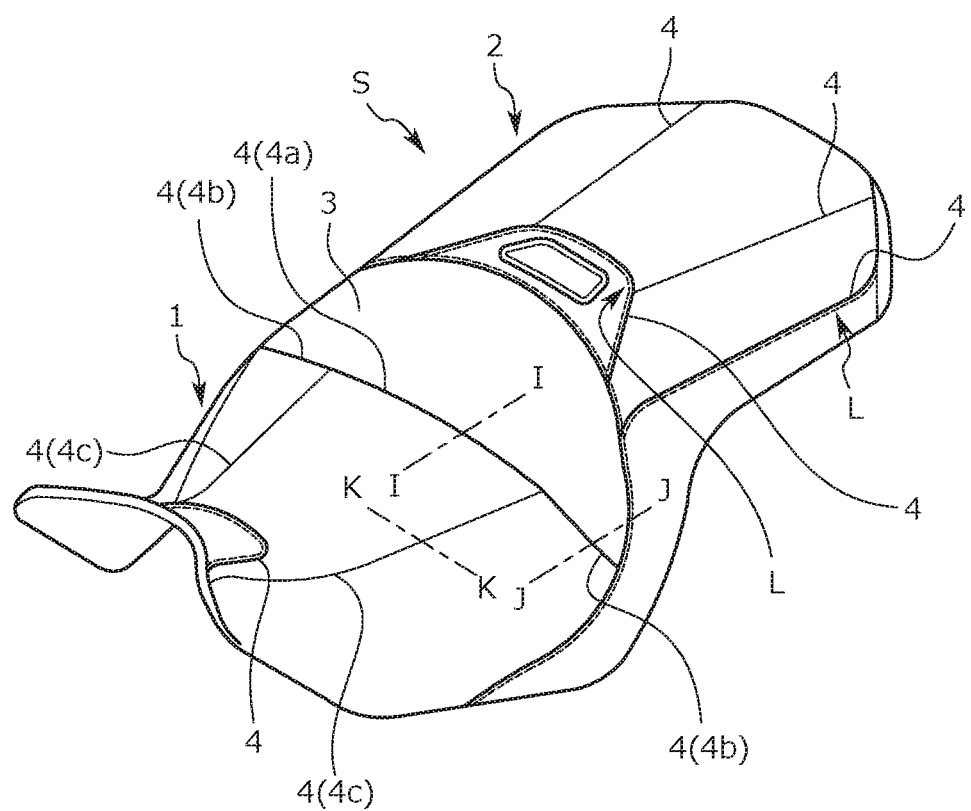
FIG. 1 is a perspective view of a conveyance seat according to an embodiment of the present invention.
Figure 2:
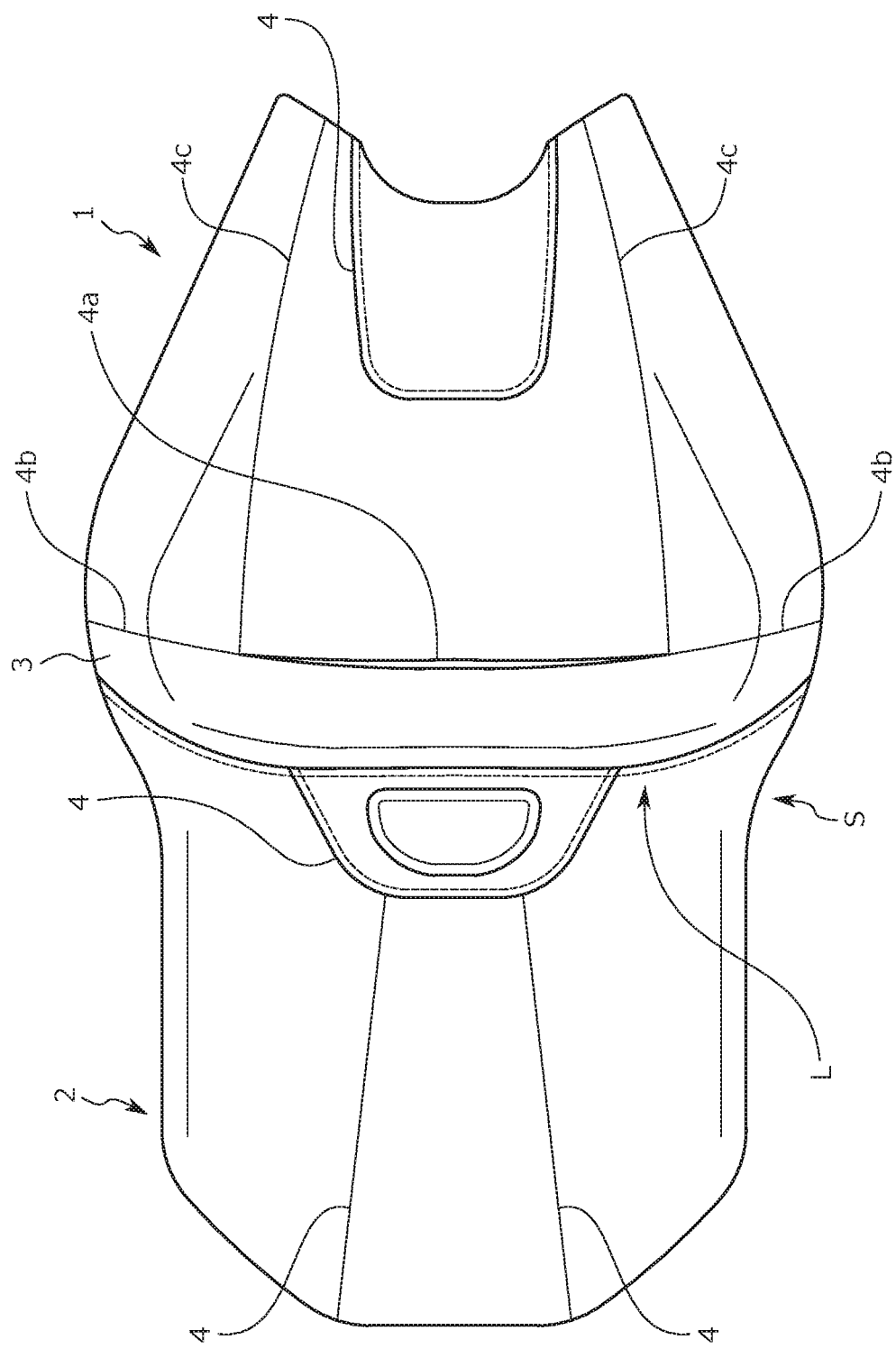
FIG. 2 is a diagram in which the conveyance seat according to the embodiment of the present invention is seen from above.
Figure 3:
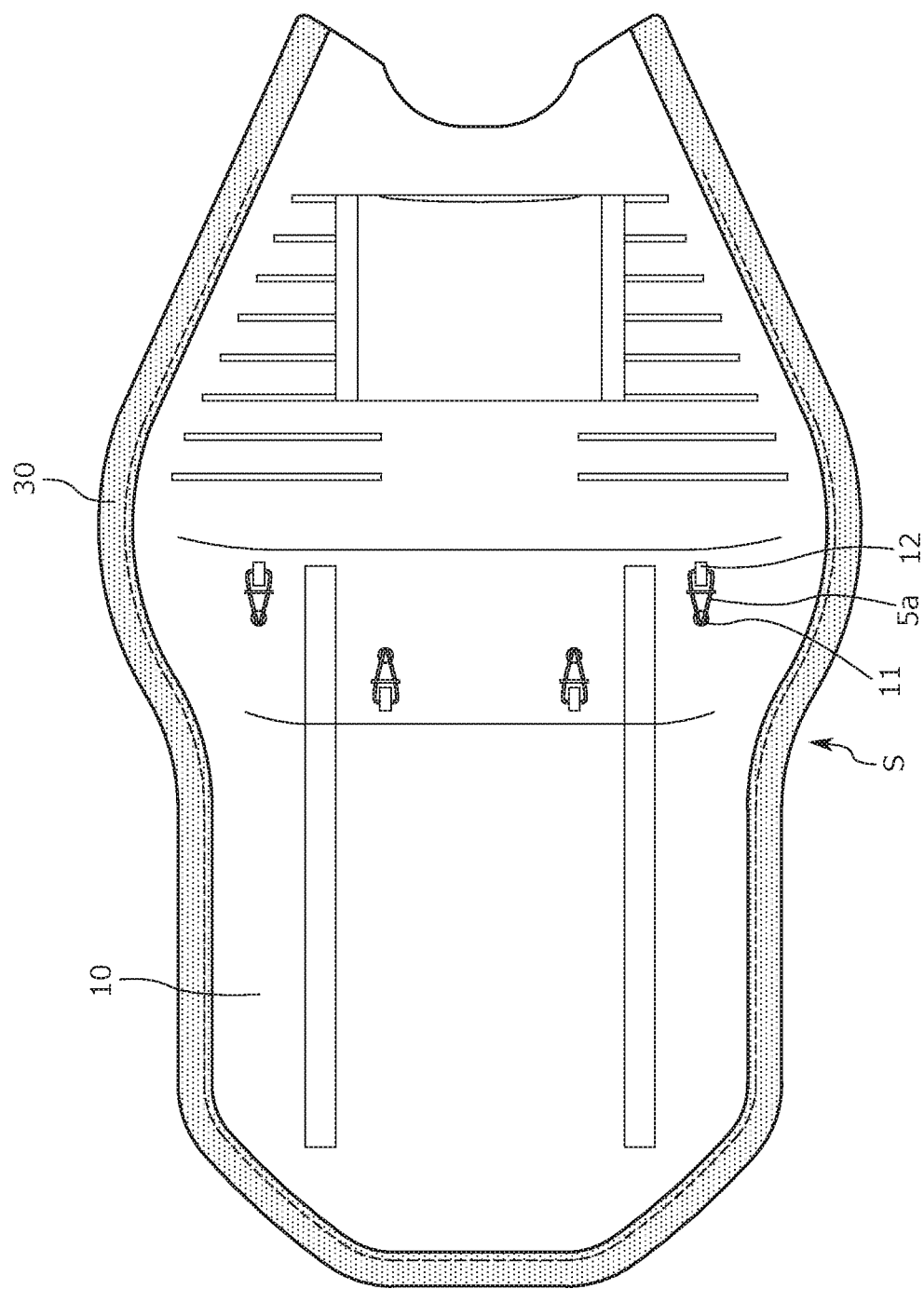
FIG. 3 is a diagram in which the conveyance seat according to the embodiment of the present invention is seen from the back side.

The configuration of the two-wheeled vehicle seat S according to the present embodiment will be described with reference to FIGS. 1 to 9. FIG. 1 is a perspective view of the two-wheeled vehicle seat S, FIG. 2 is a diagram in which the two-wheeled vehicle seat S is seen from above, and FIG. 3 is a diagram in which the two-wheeled vehicle seat S is seen from the back side. In FIG. 3, a bottom plate 10 of the two-wheeled vehicle seat S is illustrated in a somewhat simplified manner.

Figure 4:
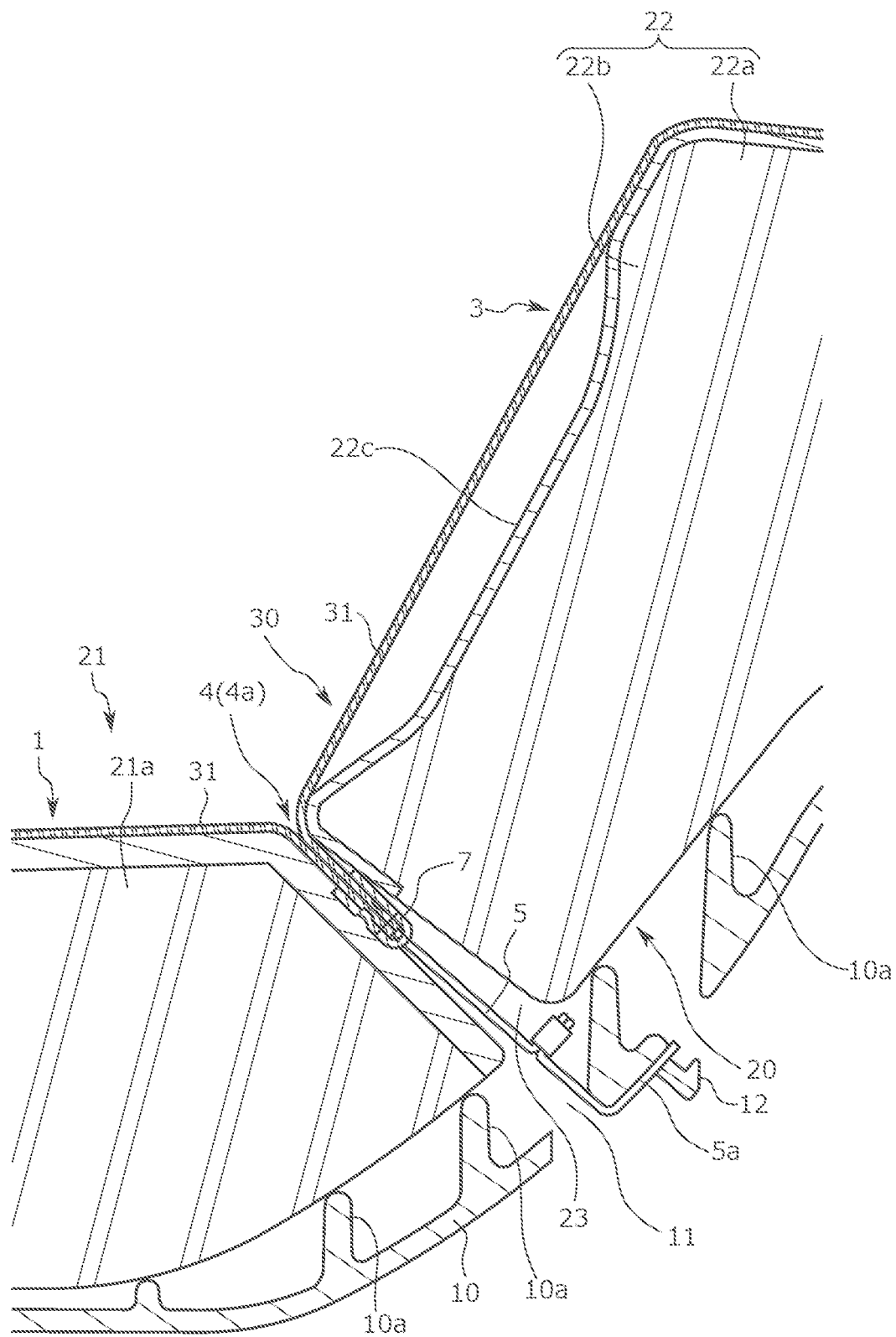
FIG. 4 is a cross-sectional view taken along line I-I of FIG. 1.
Figure 5:
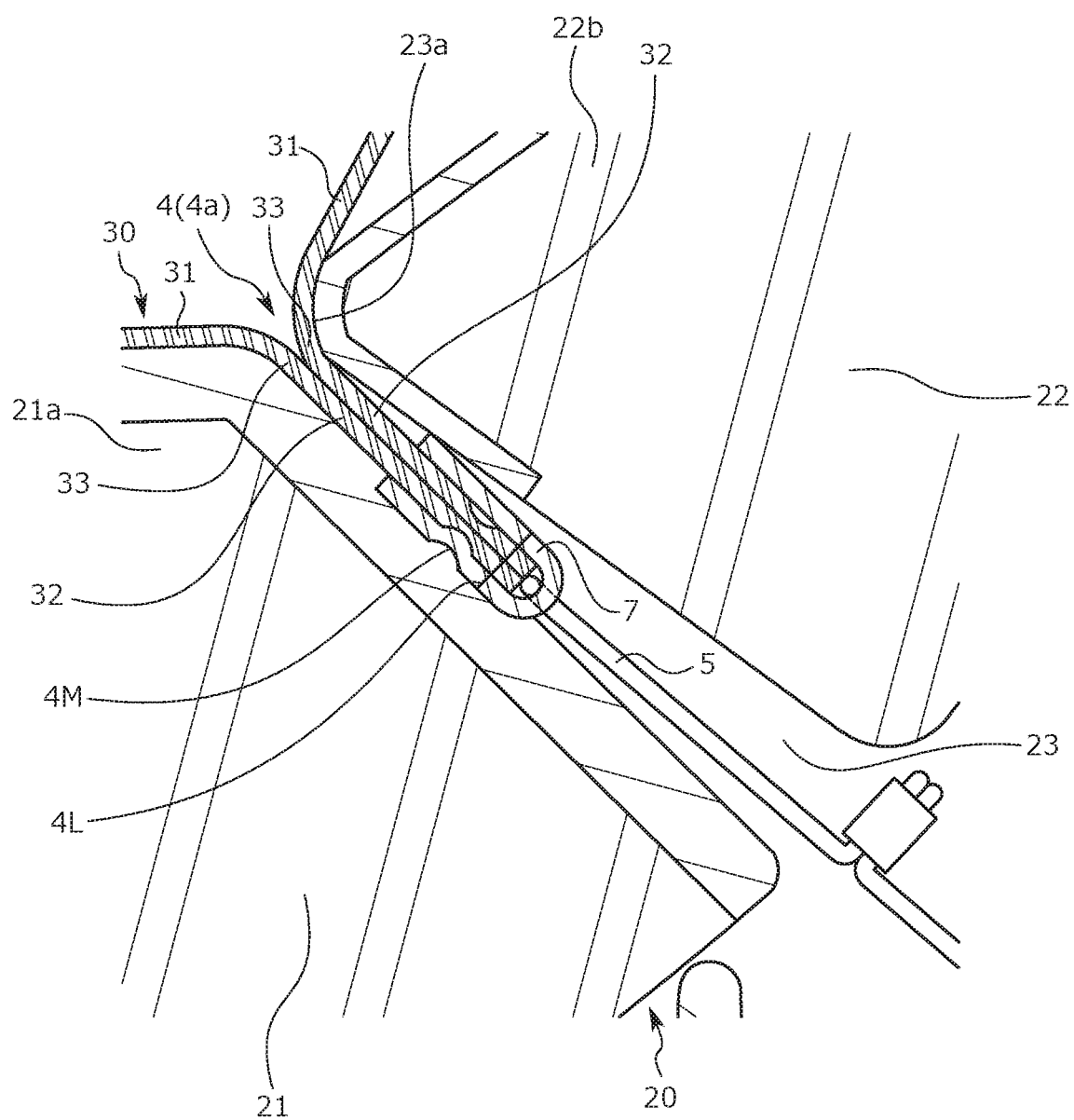
FIG. 5 is an enlarged view of the inner portion of a recessed portion illustrated in FIG. 4.
Figure 6:
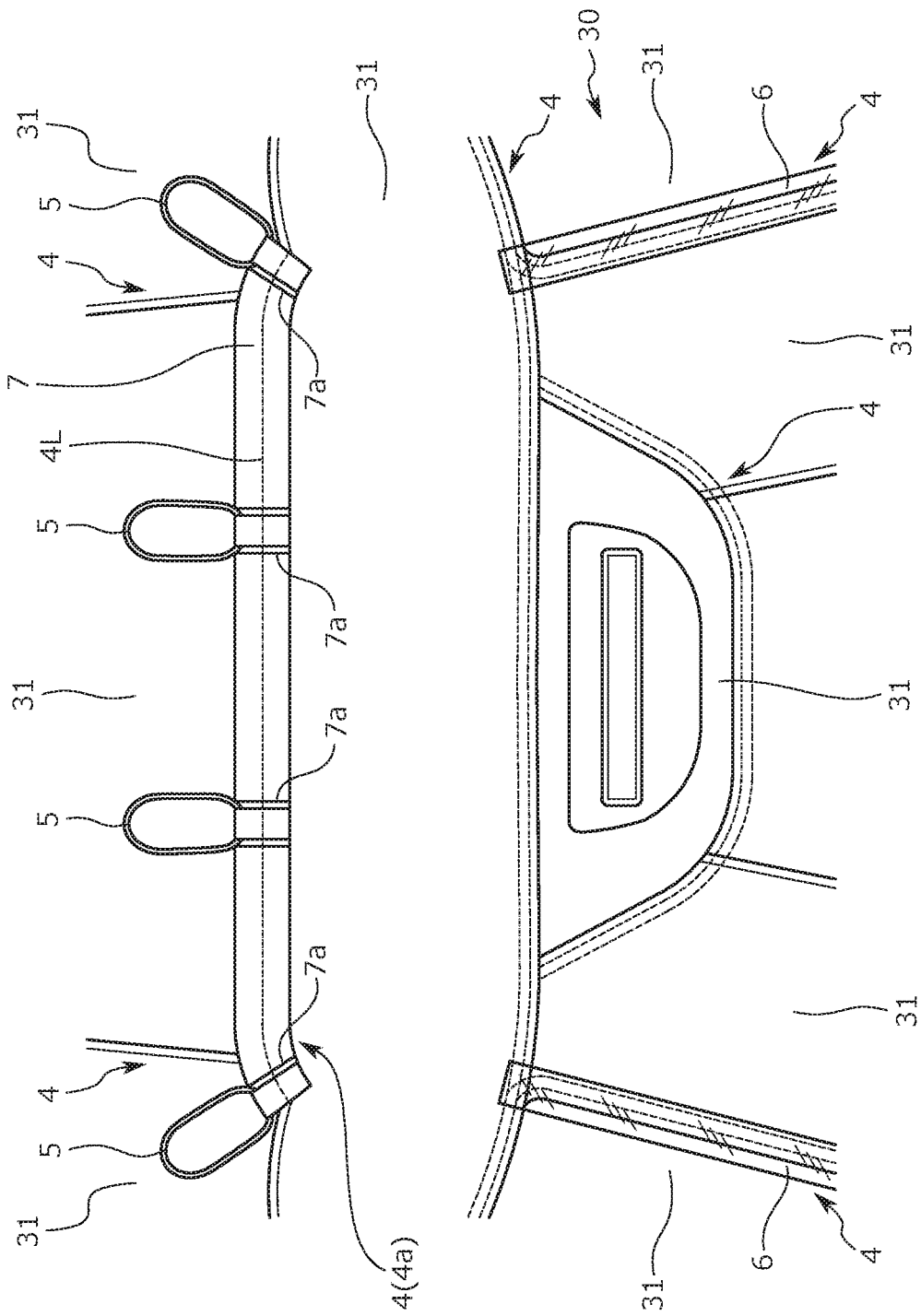
FIG. 6 is a diagram in which a skin material is seen from the back side.
Figure 7:
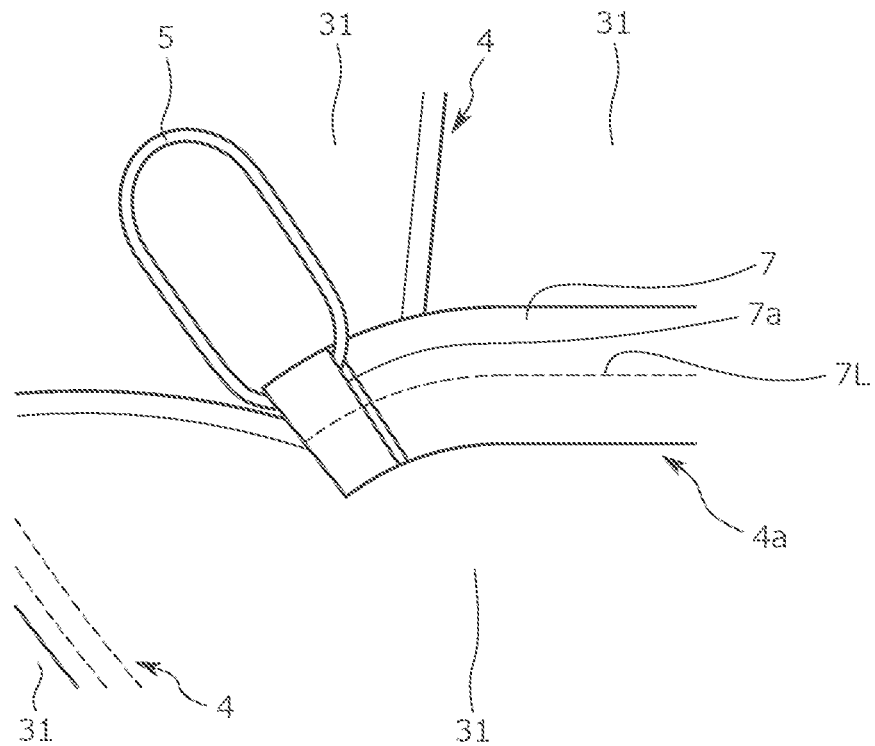
FIG. 7 is an enlarged view of the periphery of an end portion of an overlapping part illustrated in FIG. 6, which is inserted into the recessed portion.
Figure 8:
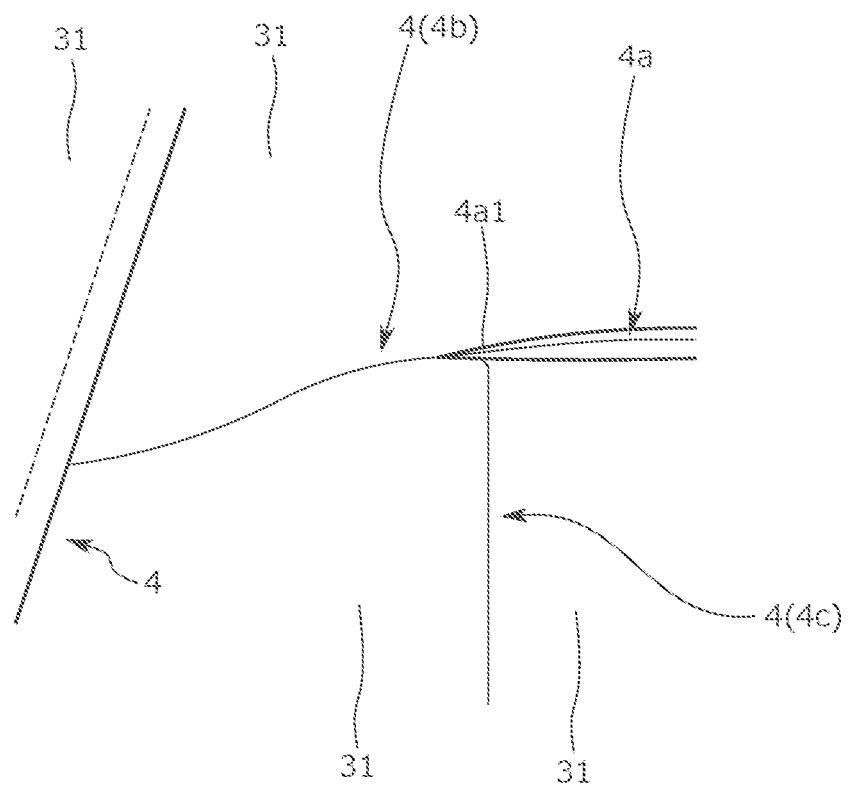
FIG. 8 is an enlarged view of the periphery of the end portion of the overlapping part, which is inserted into the recessed portion, in the appearance of the seat.

FIG. 4 is a cross-sectional view taken along line I-I of FIG. 1. FIG. 5 is an enlarged view of the inner portion of a hanging recessed portion 23 illustrated in FIG. 4. FIG. 6 is a diagram in which a skin material 30 is seen from the back side and illustrating the periphery of a hanging overlapping part 4a (described later) as a part of the back surface of the skin material 30. FIG. 7 is an enlarged view of the periphery of an end portion of the hanging overlapping part 4a illustrated in FIG. 6. FIG. 8 is an enlarged view of the periphery of the end portion of the hanging overlapping part 4a in the appearance of the seat. FIG. 9 is a cross-sectional view taken along line J-J of FIG. 12.

The two-wheeled vehicle seat S according to the present embodiment is a straddle-type seat for two people. In other words, the two-wheeled vehicle seat S is provided with a front seat 1 and a rear seat 2 as illustrated in FIG. 1. In addition, a step 3 is formed between the front seat 1 and the rear seat 2, and the rear seat 2 is positioned above the front seat 1 to the extent that the step 3 is formed.

As illustrated in FIG. 4, the two-wheeled vehicle seat S is configured by a cushion material 20 being placed on the upper surface of the bottom plate 10 and the skin material 30 covering the surface of the cushion material 20. Each component of the two-wheeled vehicle seat S will be described below.

The bottom plate 10 corresponds to a base material and may be configured by, for example, a polypropylene (PP) resin material being used. In this case, the PP resin material includes nanocellulose. In this manner, the rigidity and the strength of the bottom plate 10 can be improved and the bottom plate 10 can be reduced in thickness and weight. In addition, recyclability can be improved by the resin material constituting the bottom plate 10 including the nanocellulose.

The nanocellulose can be uniformly dispersed in a highly hydrophobic thermoplastic resin, such as polyethylene (PE) and polypropylene (PP) in particular, by being modified with a carboxylic acid that has an alicyclic hydrocarbon group. As a result, the interface adhesion between the modified nanocellulose and the resin is improved and a modified nanocellulose-resin composite material and a molded body can be obtained that are characterized by being excellent in strength, elastic modulus, and heat resistance and extremely low in linear thermal expansion coefficient to the point of being comparable to aluminum alloys. In this manner, the modified nanocellulose is capable of giving a high reinforcement effect (tensile strength) and a high elastic modulus especially to PP hardly reinforced with existing chemically modified cellulose fiber.

In addition, a resin composition including the nanocellulose may have a regular structure in which resin forms a lamellar layer and the lamellar layer is laminated in the resin composition in a direction other than the direction of the fiber length of the modified nanocellulose. In this manner, the mechanical strength of a molded body molded from the resin composition can be improved.

In addition, a nanocellulose-including resin material may constitute the bottom plate 10 as a whole. Moreover, a nanocellulose-including resin may constitute a part of the bottom plate 10, especially the periphery of an occupant seat portion where strength is required. In this manner, strength can be effectively ensured with regard to a place where the strength is required.

The cushion material 20 is configured by a pad material such as urethane being molded in a predetermined shape. In addition, the cushion material 20 is divided into two, front and rear, parts. Specifically, the cushion material 20 according to the present embodiment is divided into a first cushion material piece 21 constituting the front seat 1 and a second cushion material piece 22 constituting the rear seat 2 as illustrated in FIG. 4.

Provided in the upper portion of the first cushion material piece 21 is a first support portion 21a (corresponding to a support portion) supporting the buttocks of an occupant seated on the front seat 1 (corresponding to a seated person). Likewise, provided in the upper portion of the second cushion material piece 22 is a second support portion 22a supporting the buttocks of an occupant seated on the rear seat 2. A step-shaped rising portion 22b is provided in the front end portion of the second cushion material piece 22. The rising portion 22b is the part that forms the step 3 of the two-wheeled vehicle seat S and corresponds to the intersecting portion that intersects with the first support portion 21a at the position next to the first support portion 21a of the first cushion material piece 21.

The hanging recessed portion 23 as a recessed portion is formed between the first cushion material piece 21 and the second cushion material piece 22 of the cushion material 20. Strictly speaking, the hanging recessed portion 23 is formed at the boundary position between the first support portion 21a and the rising portion 22b. The hanging recessed portion 23 is curved to make a gentle curve when the cushion material 20 is seen from above. Specifically, the hanging recessed portion 23 is curved to become closer to the back in the middle in the width direction.

As illustrated in FIG. 6, a plurality of pieces (skin material fragments 31) constitute the skin material 30. Specifically, the skin material 30 is configured by the outer edge portions of two of the skin material fragments 31 that are next to each other being overlapped and joined to each other. As a result, a linearly extending overlapping part 4 is formed in each portion of the skin material 30. Here, the overlapping part 4 means a part of the skin material 30 where the two skin material fragments 31 face each other and includes a part where the two skin material fragments 31 are joined to each other and a part where the two skin material fragments 31 intersect with each other in a V shape or a U shape.

Focusing on the part of the skin material 30 that constitutes the front seat 1, the overlapping part 4 extending along the width direction (hereinafter, referred to as the hanging overlapping part 4a) is disposed at the position facing the hanging recessed portion 23 (that is, the boundary position between the rear end of the front seat 1 and the step 3) as illustrated in FIG. 2. When the cushion material 20 is covered by the skin material 30, the hanging overlapping part 4a is inserted into (hung in) the hanging recessed portion 23. In other words, the hanging overlapping part 4a corresponds to the overlapping part 4 that is inserted into the hanging recessed portion 23.

In addition, as illustrated in FIG. 8, the overlapping parts 4 extending to the side ends of the two-wheeled vehicle seat S along the width direction (hereinafter, referred to as bilateral overlapping parts 4b) are disposed at both side positions of the hanging overlapping part 4a in the width direction.

In addition, from the width-direction end portion of the hanging overlapping part 4a, the overlapping part 4 extending forward to intersect with the end portion (hereinafter, referred to as a forward extending overlapping part 4c) is disposed as illustrated in FIG. 8.

As illustrated in FIG. 1, the overlapping part 4 is formed also at the part of the skin material 30 that constitutes the rear seat 2. A suture line L (illustrated with a dashed line in FIG. 1) at a time when the two skin material fragments 31 constituting the overlapping part 4 are sutured is formed along a part of the overlapping part 4. As illustrated in FIG. 6, a waterproof tape 6 is affixed along the suture line L in a predetermined region (such as the place where an occupant is seated) of the part of the back surface of the skin material 30 where the suture line L is formed along the overlapping part 4.

In the present embodiment, each overlapping part 4 is formed by welding and joining of the outer edge portions of the two skin material fragments 31 overlapping each other. The skin material fragment 31 is formed of a leather material suitable for welding such as artificial polyvinyl chloride (PVC) leather. The hanging overlapping part 4a of the overlapping part 4 is configured by burr stop welder welding (described later) being performed on the two skin material fragments 31 overlapping each other. In contrast, each of the bilateral overlapping parts 4b and the forward extending overlapping part 4c is configured by electric wire welder welding (described later) being performed on the two skin material fragments 31 overlapping each other.

The cushion material 20 described above is covered by the skin material 30 configured as described above. At this time, the hanging overlapping part 4a is inserted into the hanging recessed portion 23. More specifically, a hanging string 5 as a linear member is attached to the hanging overlapping part 4a as illustrated in FIGS. 4 and 5. The hanging string 5 is tied endlessly (in an annular shape to be specific).

The hanging overlapping part 4a is inserted into the hanging recessed portion 23 from an opening 23a of the hanging recessed portion 23, and the hanging string 5 attached to the hanging overlapping part 4a is hung in the hanging recessed portion 23. A loop portion 5a formed in the end portion of the hanging string 5 passes through the bottom of the hanging recessed portion 23 and wraps around to the back surface (lower surface) of the bottom plate 10 through a through hole 11 formed in the bottom plate 10 as illustrated in FIGS. 3 and 4. The loop portion 5a is locked by a claw-shaped projection 12 formed near the through hole 11 as illustrated in FIG. 4 and is fixed to the back surface of the bottom plate 10 by a tacker.

In addition, in the present embodiment, a plurality of the hanging strings 5 (four hanging strings 5 to be specific) are attached to different width-direction parts of the hanging overlapping part 4a as illustrated in FIG. 6. The plurality of hanging strings 5 are symmetrically attached with respect to the width-direction middle position of the two-wheeled vehicle seat S as a boundary. By the plurality of hanging strings 5, a plurality of parts of the hanging overlapping part 4a different in position from one another in the width direction (that is, four parts) are symmetrically hung in the hanging recessed portion 23. The cushion material 20 is covered by the skin material 30 in this state. With this configuration, the hanging overlapping part 4a is inserted into the hanging recessed portion 23 in a balanced manner. As a result, a satisfactory seat appearance is obtained.

The number and the positions of the hanging strings 5 are not particularly limited and can be freely set insofar as the number and the positions are suitable for hanging the hanging overlapping part 4a.

In addition, in the present embodiment, the hanging string 5 that is positioned on the outermost side in the width direction among the plurality of hanging strings 5 is attached to both width-direction end portions of the hanging overlapping part 4a. In other words, in the present embodiment, both width-direction end portions of the hanging overlapping part 4a are inserted into the hanging recessed portion 23. The cushion material 20 is covered by the skin material 30 in this state. Obtained with this configuration is a satisfactory seat appearance, a satisfactory appearance of the width-direction end portions of the hanging overlapping part 4a in particular.

In addition, in the present embodiment, the hanging string 5 is attached to the hanging overlapping part 4a via a tarpaulin 7 as a cloth material. More specifically, the terminal end portion of the hanging overlapping part 4a (part where the two skin material fragments 31 constituting the hanging overlapping part 4a are joined to each other) is wrapped in the tarpaulin 7 as illustrated in FIGS. 5 and 6. Here, the tarpaulin 7 is molded to have the same length as the hanging overlapping part 4a in the width direction. In other words, the terminal end portion of the hanging overlapping part 4a is wrapped in the tarpaulin 7 from one end (left end) to the other end (right end) in the width direction as illustrated in FIG. 6.

In addition, a plurality of (four to be specific) slit holes 7a illustrated in FIG. 7 are formed at regular intervals in the width direction in the tarpaulin 7. Each of the plurality of slit holes 7a is a hole (slit) formed so that the hanging string 5 passes therethrough, and one hanging string 5 passes through one slit hole 7a. The hanging string 5 passing through the slit hole 7a is locked at the part of the tarpaulin 7 that is positioned between the slit holes 7a. As a result, the hanging string 5 is attached to the hanging overlapping part 4a via the tarpaulin 7.

The strength of the hanging overlapping part 4a is improved by the terminal end portion of the hanging overlapping part 4a being wrapped in the tarpaulin 7 as described above. Accordingly, creasing in the periphery of the hanging overlapping part 4a is suppressed when the hanging overlapping part 4a is hung in the hanging recessed portion 23. As a result, the hanging overlapping part 4a is appropriately inserted into the hanging recessed portion 23. This effect is especially effective in a case where the hanging overlapping part 4a is hung in the hanging recessed portion 23 curved in an arc shape.

The tarpaulin 7 itself is fixed to the hanging overlapping part 4a by sewing and welding. In other words, a sewing portion 4L and a welded portion 4M are formed so that the tarpaulin 7 is fixed to the hanging overlapping part 4a. The welded portion 4M is the place where the tarpaulin 7 is welder-welded to the hanging overlapping part 4a. The part of the tarpaulin 7 that is positioned in the welded portion 4M is recessed by being pressed by a welder during the welder welding.

The sewing portion 4L is a part that is formed so that the tarpaulin 7 is sutured to the hanging overlapping part 4a. As a result of the formation of the sewing portion 4L, the two skin material fragments 31 constituting the hanging overlapping part 4a also are sutured (joined). As a result, the strength (joining strength) of the terminal end portion of the hanging overlapping part 4a is further enhanced. The slit hole 7a formed in the tarpaulin 7 is formed at a position not hanging on the sewing portion 4L.

In a state where the hanging overlapping part 4a is inserted into the hanging recessed portion 23, the sewing portion 4L is present at the part of the hanging overlapping part 4a that is closer to the bottom plate 10 than the opening 23a of the hanging recessed portion 23 as illustrated in FIG. 5. In other words, in the present embodiment, the two skin material fragments 31 constituting the hanging overlapping part 4a are sutured at the part closer to the bottom plate 10 than the opening 23a of the hanging recessed portion 23 in a state where the hanging overlapping part 4a is inserted into the hanging recessed portion 23. As a result, the strength of the part of the hanging overlapping part 4a that is closer to the deep portion of the hanging recessed portion 23 is improved.

As illustrated in FIG. 4, in the present embodiment, the overlapping part 4 inserted into the hanging recessed portion 23 heads rearward and downward as the overlapping part 4 is inserted to the back side of the hanging recessed portion 23. More specifically, the hanging overlapping part 4a is inserted into the hanging recessed portion 23 while heading rearward and tilting obliquely downward at approximately 45 degrees. The cushion material 20 is covered by the skin material 30 in this state. With this configuration, creasing of the skin material 30 is unlikely to occur in the periphery of the hanging recessed portion 23 even when an occupant is seated on the front seat 1 of the two-wheeled vehicle seat S.

As illustrated in FIG. 5, in the present embodiment, the hanging overlapping part 4a has a relatively shallow position when inserted into the hanging recessed portion 23. More specifically, the respective parts of the two skin material fragments 31 constituting the hanging overlapping part 4a that are welded and joined to each other (specifically, first parts 32 to be described later) are disposed at positions closer to the opening 23a than the middle of the hanging recessed portion 23 in the depth direction of the hanging recessed portion 23. The cushion material 20 is covered by the skin material 30 in this state. With this configuration, the yield of the skin material 30 is higher than in a case where the hanging overlapping part 4a is inserted up to the deep portion in the hanging recessed portion 23. In addition, with this configuration, rainwater or the like is unlikely to accumulate in the space in the hanging recessed portion 23 into which the hanging overlapping part 4a is inserted. As a result, the clothes (especially the pants) of an occupant seated on the front seat 1 of the two-wheeled vehicle seat S becoming wet can be effectively suppressed.

In addition, in the present embodiment, the hanging overlapping part 4a is formed in a preferred manner for hanging shallowly in the hanging recessed portion 23 as described above. More specifically, the hanging overlapping part 4a is formed such that each of the two skin material fragments 31 constituting the hanging overlapping part 4a has the first part 32 satisfying the following condition (1) and a second part 33 satisfying the following condition (2): (1) The respective first parts 32 of the two skin material fragments 31 being in contact with each other on the back side of the hanging recessed portion 23 behind the opening 23a of the hanging recessed portion 23 and parts of the respective first parts 32 of the two skin material fragments 31 being crushed, (2) The respective second parts 33 in the two skin material fragments 31 being adjacent to the first parts 32 at positions closer to the opening 23a of the hanging recessed portion 23 than the first parts 32 and the second parts 33 being separated from each other such that the gap between the second parts 33 decreases as the first part 32 is approached.

Describing the condition (1) above, the first parts 32 are the respective parts of the two skin material fragments 31 constituting the hanging overlapping part 4a that are joined by welder welding (strictly speaking, the burr stop welder welding to be described later) and form the terminal end portion of the hanging overlapping part 4a. The part of the first part 32 that is pressed by a welder during the welder welding is crushed.

Once the hanging overlapping part 4a is hung in the hanging recessed portion 23, the first parts 32 that are joined to each other are inserted into the hanging recessed portion 23 as illustrated in FIG. 5.

Describing the condition (2) above, the second parts 33 are the respective parts of the two skin material fragments 31 constituting the hanging overlapping part 4a that are separated from each other and intersecting with each other in a V shape. Once the hanging overlapping part 4a is hung in the hanging recessed portion 23, the second parts 33 intersecting with each other in the V shape are disposed near the opening 23a of the hanging recessed portion 23 as illustrated in FIG. 5. At this time, the open-side gap as one of the gaps between the second parts 33 is relatively narrow.

By each of the two skin material fragments 31 constituting the hanging overlapping part 4a being provided with the first part 32 and the second part 33 as described above, rainwater accumulation or the like can be suppressed in the hanging recessed portion 23 and a satisfactory seat appearance can be obtained at the same time. More specifically, the second parts 33 disposed in the periphery of the opening 23a of the hanging recessed portion 23 in the two skin material fragments 31 constituting the hanging overlapping part 4a intersect with each other in a V shape as described above. In addition, the open-side gap as one of the gaps between the second parts 33 is relatively narrow. Accordingly, even when the hanging overlapping part 4a is shallowly hung in the hanging recessed portion 23, the appearance of the hanging line can be satisfactory. In addition, by the hanging overlapping part 4a being shallowly hung in the hanging recessed portion 23, rainwater or the like is unlikely to accumulate in the space in the hanging recessed portion 23 into which the hanging overlapping part 4a is inserted.

In addition, the overlapping parts 4 extending along the width direction (that is, the bilateral overlapping parts 4b) are disposed at both side positions of the hanging overlapping part 4a in the width direction in the skin material 30. Each of the bilateral overlapping parts 4b is formed such that each of the two skin material fragments 31 constituting the bilateral overlapping part 4b has a third part 34 satisfying the following condition (3): (3) The respective third parts 34 of the two skin material fragments 31 being welded to be in contact with each other and a molten material 34a of the third part 34 being formed at the position of the place where the third parts 34 are in contact with each other.

Figure 9A:
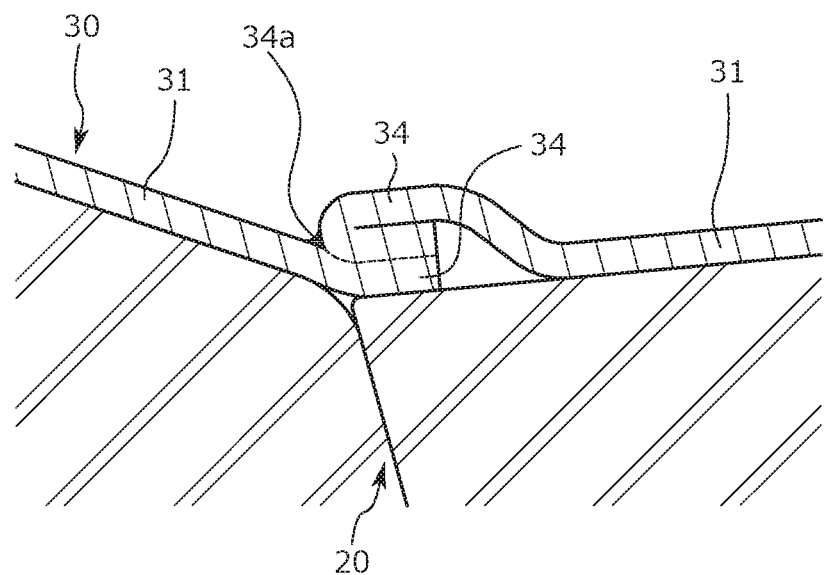
FIG. 9A is a cross-sectional view taken along line J-J of FIG. 1.

Describing the condition (3) above, the third part 34 is the part of each of the two skin material fragments 31 constituting each of the bilateral overlapping parts 4b that is joined by welder welding (strictly speaking, the electric wire welder welding to be described later). One of the third parts 34 is folded back in a U shape as illustrated in FIG. 9A, and the folded part and the other third part 34 are joined to each other. Although there is initially a V-shaped gap between the folded part of the third part 34 that is folded back in the U shape and the other third part 34, the molten material 34a of the third part 34 is generated in the V-shaped gap by the third parts 34 being joined to each other by the electric wire welder welding.

By each of the two skin material fragments 31 constituting each of the bilateral overlapping parts 4b being provided with the third part 34 as described above, unevenness attributable to the formation of the bilateral overlapping parts 4b can be suppressed and strength can be sufficiently ensured at the bilateral overlapping parts 4b. In addition, by the bilateral overlapping parts 4b being provided at both side positions of the hanging overlapping part 4a, strength can be ensured at both side positions of the hanging overlapping part 4a.

In addition, the overlapping part 4 extending forward to intersect with the end portion (that is, the forward extending overlapping part 4c) is disposed from the width-direction end portion of the hanging overlapping part 4a in the skin material 30. The forward extending overlapping part 4c is formed such that each of the two skin material fragments 31 constituting the forward extending overlapping part 4c has a fourth part 35 satisfying the following condition (4) and a fifth part 36 satisfying the following condition (5): (4) The respective fourth parts 35 of the two skin material fragments 31 being welded to be in contact with each other and parts of the respective fourth parts 35 of the two skin material fragments 31 being crushed, (5) The respective fifth parts 36 in the two skin material fragments 31 being adjacent to the fourth parts 35 and the fifth parts 36 being separated from each other such that the gap between the fifth parts 36 decreases as the fourth part 35 is approached.

Figure 9B:
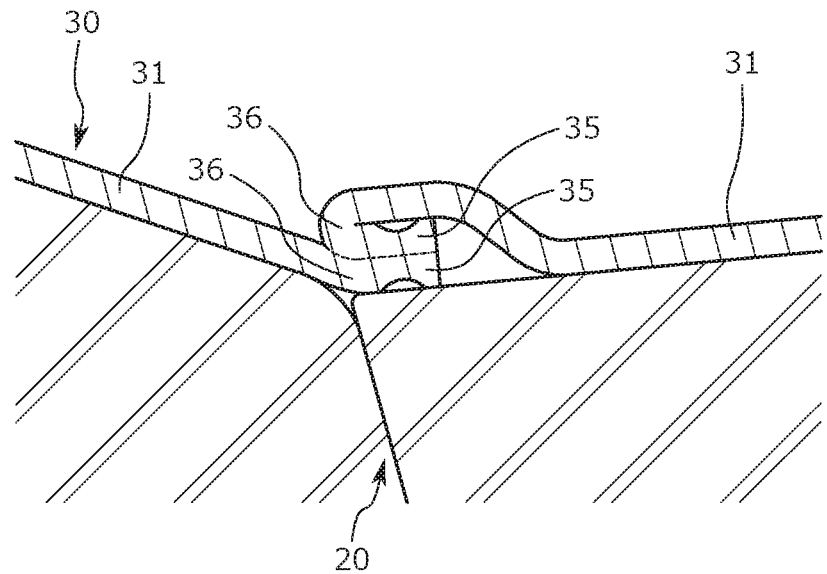
FIG. 9B is a cross-sectional view taken along line K-K of FIG. 1.

The condition (4) above is almost the same as the condition (1) above. In other words, the fourth parts 35 are joined by welder welding (strictly speaking, the burr stop welder welding to be described later). More specifically, the folded part of one of the fourth parts 35 that is folded back in a U shape and the other fourth part 35 are joined to each other as illustrated in FIG. 9B. The part of the fourth part 35 that is pushed up by a welder during the welder welding is crushed.

The condition (5) above is almost the same as the condition (2) above. The fifth part 36 is the part of each of the two skin material fragments 31 constituting the forward extending overlapping part 4c that is adjacent to the fourth part 35. The fifth parts 36 are separated from each other and intersect with each other in a V shape.

By each of the two skin material fragments 31 constituting the forward extending overlapping part 4c being provided with the fourth part 35 and the fifth part 36 as described above, the stress can be dispersed that is applied to the skin material 30 (especially the vicinity of the hanging overlapping part 4a) when the hanging overlapping part 4a intersecting with the forward extending overlapping part 4c is hung in the hanging recessed portion 23. In addition, creasing of the skin material 30 in the periphery of the hanging line can be suppressed, and thus a satisfactory seat appearance can be obtained.

Figure 10:
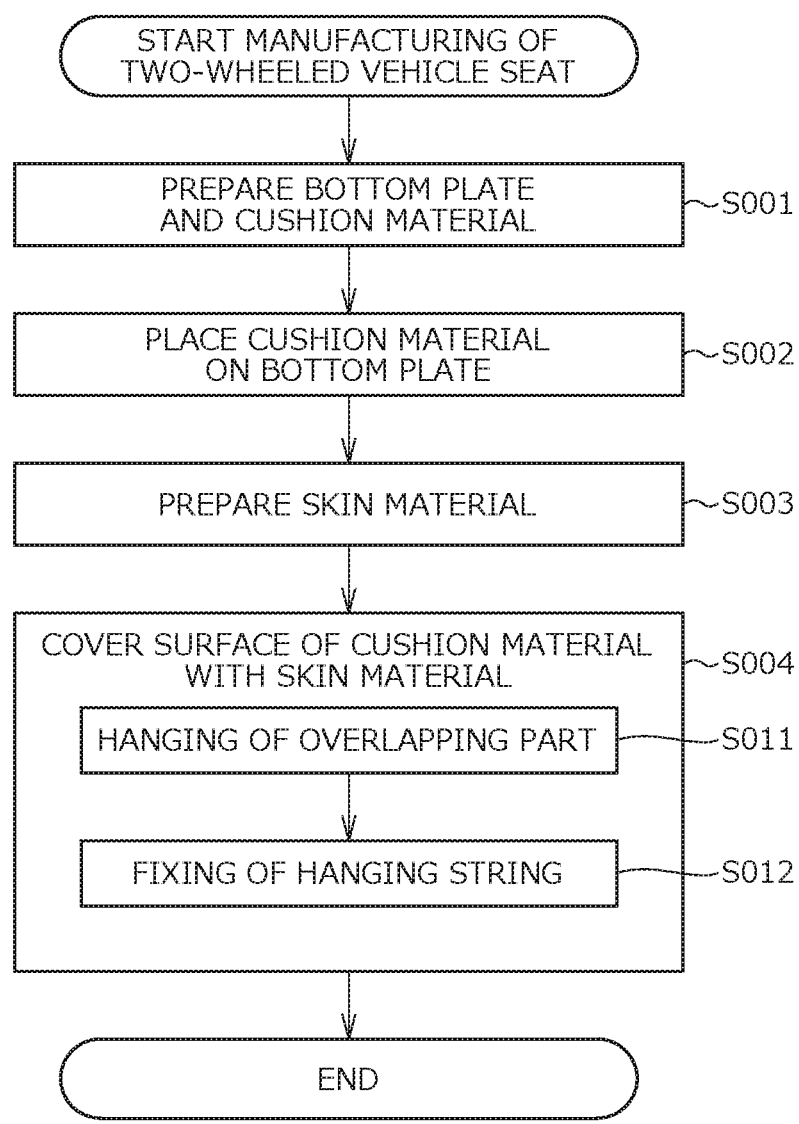
FIG. 10 is a diagram illustrating the flow of a procedure for manufacturing the conveyance seat according to the embodiment of the present invention.
Figure 11:
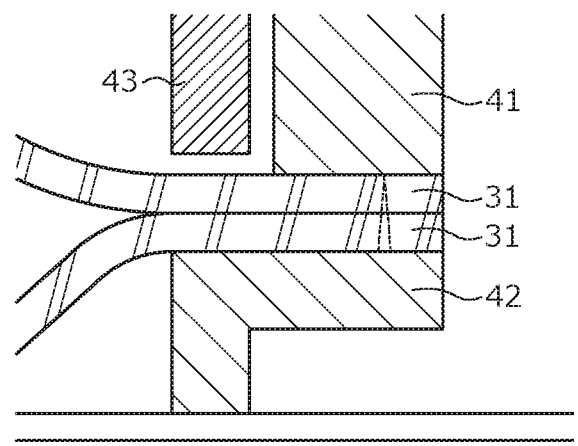
FIG. 11 is an explanatory diagram of burr stop welder welding.
Figure 12:
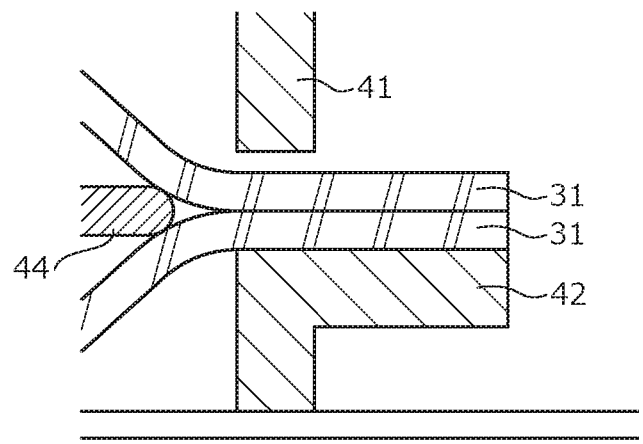
FIG. 12 is an explanatory diagram of electric wire welder welding.
Figure 13:
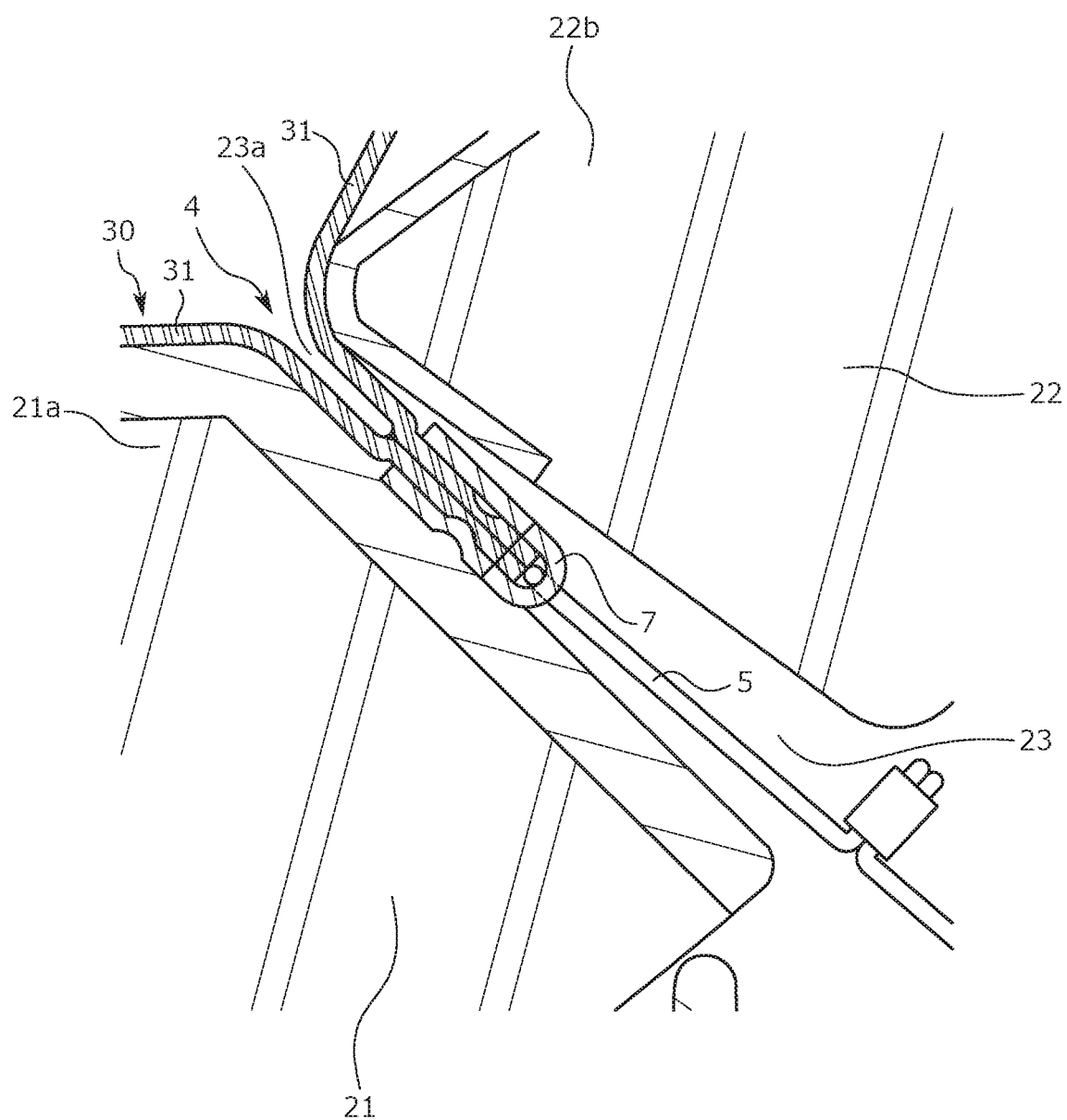
FIG. 13 is a diagram illustrating a comparative example.

Method for Manufacturing Two-Wheeled Vehicle Seat According to Present Embodiment A method for manufacturing the two-wheeled vehicle seat S described above will be described below with reference to FIGS. 10 to 13. FIG. 10 is a diagram illustrating the flow of a procedure for manufacturing the two-wheeled vehicle seat S. FIG. 11 is an explanatory diagram of the burr stop welder welding. FIG. 12 is an explanatory diagram of the electric wire welder welding. FIG. 13 is a diagram illustrating a comparative example. More specifically, FIG. 13 is a diagram illustrating the sectional structure of the hanging line in a case where the hanging overlapping part 4a is formed by the electric wire welder welding.

A process for manufacturing the two-wheeled vehicle seat S proceeds in accordance with the procedure illustrated in FIG. 10. Specifically, the bottom plate 10 and the cushion material 20 are prepared (S001) and the cushion material 20 is placed on the bottom plate 10 (S002). Then, the skin material 30 that has the overlapping part 4 is prepared (S003) by the outer edge portions of the plurality of skin material fragments 31 being overlapped and welder-welded, and the surface of the cushion material 20 on the bottom plate 10 is covered by the skin material 30 (S004). At this time, the hanging overlapping part 4a is hung in the hanging recessed portion 23 of the cushion material 20 (S011). In other words, the cushion material 20 is covered by the skin material 30 such that the hanging overlapping part 4a is inserted into the hanging recessed portion 23.

Here, describing a method for welding the two skin material fragments 31 constituting the overlapping part 4, the burr stop welder welding illustrated in FIG. 11 is used for the hanging overlapping part 4a of the overlapping part 4. During the burr stop welder welding, the parts of the two skin material fragments 31 constituting the hanging overlapping part 4a that are joined to each other (that is, the first parts 32) are welded after being pinched between a pair of upper and lower welding molds 41 and 42. Furthermore, during the burr stop welder welding, a burr stop pressing tool 43 is pressed, as illustrated in FIG. 11, against the part of each of the two skin material fragments 31 that is adjacent to the place pinched between the welding molds 41 and 42 (that is, the second part 33). As a result, the two skin material fragments 31 respectively having the first parts 32 satisfying the condition (1) above and the second parts 33 satisfying the condition (2) above constitute the hanging overlapping part 4*a*.

The electric wire welder welding illustrated in FIG. 12 is used for the bilateral overlapping parts 4*b* of the overlapping part 4. During the electric wire welder welding, the parts of the two skin material fragments 31 constituting the bilateral overlapping parts 4*b* that are joined to each other (that is, the third parts 34) are welded after being pinched between the pair of upper and lower welding molds 41 and 42. Furthermore, during the electric wire welder welding, a welded electric wire 44 is pressed, as illustrated in FIG. 12, against the positions of the parts of the two skin material fragments 31 that are joined to each other. As a result, the two skin material fragments 31 respectively having the third parts 34 satisfying the condition (3) above constitute the bilateral overlapping parts 4*b*.

The burr stop welder welding illustrated in FIG. 11 is used for the forward extending overlapping part 4*c* of the overlapping part 4. In other words, the parts of the two skin material fragments 31 constituting the forward extending overlapping part 4*c* that are joined to each other (that is, the fourth parts 35) are welded after being pinched between the pair of upper and lower welding molds 41 and 42. Furthermore, the burr stop pressing tool 43 is pressed against the part of each of the two skin material fragments 31 that is adjacent to the place pinched between the welding molds 41 and 42 (that is, the fifth part 36). As a result, the two skin material fragments 31 respectively having the fourth parts 35 satisfying the condition (4) above and the fifth parts 36 satisfying the condition (5) above constitute the forward extending overlapping part 4*c*.

In a case where not the burr stop welder welding but the electric wire welder welding is used for the formation of the hanging overlapping part 4*a*, a molten material is formed at the positions of the parts of the two skin material fragments 31 constituting the hanging overlapping part 4*a* that are joined to each other (parts corresponding to the first parts 32). In this case, parts present at positions adjacent to the parts of the two skin material fragments 31 joined to each other (parts corresponding to the second parts 33) are separated from each other with a relatively wide gap.

In a case where the hanging overlapping part 4*a* that is formed in a state where the gap between the skin material fragments 31 is relatively wide as described above (hereinafter, referred to as an "open state") is hung in the hanging recessed portion 23, the hanging overlapping part 4*a* in the open state is seen (exposed) as it is when the hanging position thereof is shallow. Accordingly, with regard to the hanging overlapping part 4*a* in the open state, the hanging overlapping part 4*a* is shaped to be hung up to the deep portion of the hanging recessed portion 23, as illustrated in FIG. 13, for a satisfactory seat appearance. However, when the hanging overlapping part 4*a* is deeply hung, the space in the hanging recessed portion 23 into which the hanging overlapping part 4*a* is inserted becomes large. As a result, rainwater or the like is likely to accumulate in the hanging recessed portion 23.

In the present embodiment, in contrast, the hanging overlapping part 4*a* is formed by the burr stop welder welding. In this case, the hanging overlapping part 4*a* is formed in a state where the gap between the skin material fragments 31 is relatively narrow. With the hanging overlapping part 4*a* configured as described above, hanging up to the deep portion of the hanging recessed portion 23 for a satisfactory seat appearance is unnecessary and the hanging position thereof can be set relatively shallow. As a result, rainwater accumulation or the like can be suppressed in the space in the hanging recessed portion 23 into which the hanging overlapping part 4*a* is inserted.

Returning to the description of the process for manufacturing the two-wheeled vehicle seat S, when the hanging overlapping part 4*a* is hung in the hanging recessed portion 23, each of the plurality of hanging strings 5 attached to each portion of the hanging overlapping part 4*a* via the tarpaulin 7 is hung. As a result, the middle portion and both end portions of the hanging overlapping part 4*a* in the width direction are inserted into the hanging recessed portion 23 and hanging can be performed in a balanced manner.

In addition, each hanging string 5 is hung to head rearward and downward toward the deep portion of the hanging recessed portion 23. In other words, in the present embodiment, the hanging overlapping part 4*a* is hung to head rearward and downward as the hanging overlapping part 4*a* is inserted to the back side of the hanging recessed portion 23.

The hanging string 5 reaching the back side of the bottom plate 10 through the hanging recessed portion 23 is fixed to the bottom plate 10 by the tacker (S012) after the loop portion 5*a* formed in the lower end portion thereof is hooked by the claw-shaped projection 12 of the bottom plate 10.

The two-wheeled vehicle seat S according to the present embodiment is completed through the procedure described above.

Another Embodiment

The conveyance seat and the method for manufacturing the conveyance seat according to the present invention have been exemplified above. However, the embodiment described above is merely an example and other embodiments are also conceivable. For example, in the embodiment described above, the tarpaulin 7 wrapping the terminal end portion of the hanging overlapping part 4*a* is one sheet and has the same length as the hanging overlapping part 4*a* in the width direction. However, the present invention is not limited thereto and a plurality of fragmented ring-shaped tarpaulins 7*x* may be disposed in places separated in the width direction as illustrated in FIG. 14 instead. FIG. 14 is a diagram illustrating an attachment structure for the tarpaulins 7*x* according to a modification example. As illustrated in FIG. 14, the plurality of tarpaulins 7*x* are attached to the hanging overlapping part 4*a* at the positions separated in the width direction and each of the tarpaulins 7*x* is hooked by the hanging string 5. Still, attachment work for the tarpaulin 7 is easier when one sheet of the tarpaulin 7 is continuous from one end to the other end of the hanging overlapping part 4*a* in the width direction as in the embodiment described above. In addition, the strength (tensile strength) of the hanging overlapping part 4*a* wrapped in the tarpaulin 7 can be more effectively improved by the single continuous tarpaulin 7. The embodiment described above is desirable in this regard.

In the embodiment described above, the electric wire welder welding-based overlapping parts 4 (that is, the bilateral overlapping parts 4*b*) are disposed at both side positions of the hanging overlapping part 4*a* so that strength is ensured. In addition, the burr stop welder welding-based overlapping part 4 (that is, the forward extending overlapping part 4c) is disposed at the position intersecting with the width-direction end portion of the hanging overlapping part 4a. However, the present invention is not limited thereto and the bilateral overlapping parts 4b and the forward extending overlapping part 4c may be omitted.

REFERENCE SIGNS LIST

1 Front seat
2 Rear seat
3 Step
4 Overlapping part
4a Hanging overlapping part (first overlapping part)
4a1 End portion of first overlapping part
4b Bilateral overlapping part (second overlapping part)
4c Forward extending overlapping part (second overlapping part)
4L Sewing portion
4M Welded portion
5 Hanging string (linear member)
5a Loop portion
6 Waterproof tape
7 Tarpaulin
7a Slit hole (hole)
7x Tarpaulin
10 Bottom plate (base material)
10a Projection
11 Through hole
12 Claw-shaped projection
20 Cushion material
21 First cushion material piece
21a First support portion (support portion)
22 Second cushion material piece
22a Second support portion
22b Rising portion (intersecting portion)
22c Recess
23 Hanging recessed portion (recessed portion)
23a Opening
30 Skin material
31 Skin material fragment
32 First part
33 Second part
34 Third part
34 34a Molten material
35 Fourth part
36 Fifth part
41 Welding mold
42 Welding mold
43 Pressing tool
44 Welded electric wire
L Suture line
S Two-wheeled vehicle seat (conveyance seat)

What is claimed is:

1. A method for manufacturing a conveyance seat, the method comprising:
    preparing a cushion material divided into a first cushion material piece having a support portion supporting a seated person's buttocks and a second cushion material piece having an intersecting portion intersecting with the support portion at a position next to the support portion, a recessed portion being formed at a boundary position between the support portion and the intersecting portion in the cushion material;
    preparing a skin material having an overlapping part configured by two skin material fragments overlapping each other;
    covering the cushion material by the skin material such that the overlapping part is inserted into the recessed portion; and
    forming the overlapping part inserted into the recessed portion such that each of the two skin material fragments constituting the overlapping part has a first part and a second part, the first parts satisfying the following condition (1) and the second parts satisfying the following condition (2):
    (1) the respective first parts of the two skin material fragments being welded to be in contact with each other on a back side of the recessed portion behind an opening of the recessed portion and parts of the respective first parts of the two skin material fragments being crushed,
    (2) the respective second parts in the two skin material fragments being adjacent to the first parts at positions closer to the opening of the recessed portion than the first parts and the second parts being separated from each other such that a gap between the second parts decreases as the first part is approached, wherein
    the overlapping part inserted into the recessed portion extends along a width direction of the conveyance seat,
    a linear member for hanging the overlapping part is attached to the overlapping part inserted into the recessed portion,
    the overlapping part inserted into the recessed portion is wrapped in a tarpaulin, the tarpaulin having the same length as the overlapping part inserted into the recessed portion in the width direction and comprising a hole for passing the linear member,
    the linear member has an annular shape, and
    an end of the linear member on a seating surface side of the conveyance seat is wrapped in the tarpaulin.

2. A conveyance seat comprising:
    a cushion material divided into a first cushion material piece having a support portion supporting a seated person's buttocks and a second cushion material piece having an intersecting portion intersecting with the support portion at a position next to the support portion, a recessed portion being formed at a boundary position between the support portion and the intersecting portion in the cushion material; and
    a skin material having an overlapping part configured by two skin material fragments overlapping each other, wherein
    the cushion material is covered by the skin material in a state where the overlapping part is inserted into the recessed portion,
    the overlapping part inserted into the recessed portion is formed such that each of the two skin material fragments constituting the overlapping part has a first part and a second part, the first parts satisfying the following condition (1) and the second parts satisfying the following condition (2):
    (1) the respective first parts of the two skin material fragments being in contact with each other on a back side of the recessed portion behind an opening of the recessed portion and parts of the respective first parts of the two skin material fragments being crushed,
    (2) the respective second parts in the two skin material fragments being adjacent to the first parts at positions closer to the opening of the recessed portion than the first parts and the second parts being separated from each other such that a gap between the second parts decreases as the first part is approached, the overlapping part inserted into the recessed portion extends along a width direction of the conveyance seat, a linear member for hanging the overlapping part is attached to the overlapping part inserted into the recessed portion, the overlapping part inserted into the recessed portion is wrapped in a tarpaulin, the tarpaulin having the same length as the overlapping part inserted into the recessed portion in the width direction and comprising a hole for passing the linear member, the linear member has an annular shape, and an end of the linear member on a seating surface side of the conveyance seat is wrapped in the tarpaulin.

3. The conveyance seat according to claim 2, wherein the cushion material is covered by the skin material such that the respective first parts of the two skin material fragments constituting the overlapping part inserted into the recessed portion are closer to the opening than a middle of the recessed portion in a depth direction of the recessed portion.

4. The conveyance seat according to claim 2, wherein the overlapping part is a first overlapping part and extends in the width direction of the conveyance seat, the skin material further comprises a second overlapping part that extends from a position next to an end portion of the first overlapping part, and the second overlapping part is formed such that each of the two skin material fragments constituting the second overlapping part has a third part satisfying the following condition (3):

(3) the respective third parts of the two skin material fragments being welded to be in contact with each other and a molten material of the third part being formed at a position of a place where the third parts are in contact with each other.

5. The conveyance seat according to claim 2, wherein the cushion material is placed on a base material, and the two skin material fragments constituting the overlapping part inserted into the recessed portion are sutured at a part closer to the base material than the opening of the recessed portion in a state where the overlapping part is inserted into the recessed portion.

6. The conveyance seat according to claim 2, wherein the cushion material is covered by the skin material such that an end portion of the overlapping part in the width direction is inserted into the recessed portion.

7. The conveyance seat according to claim 2, wherein the cushion material is covered by the skin material such that a plurality of parts of the overlapping part inserted into the recessed portion different in position from one another in the width direction are hung in the recessed portion.

8. The conveyance seat according to claim 2, wherein the cushion material is covered by the skin material such that the overlapping part inserted into the recessed portion heads rearward and downward as the overlapping part is inserted to the back side of the recessed portion.

9. The conveyance seat according to claim 2, wherein the overlapping part is a first overlapping part and extends in the width direction of the conveyance seat, the skin material further comprises a second overlapping part that extends to intersect with an end portion of the first overlapping part, and the second overlapping part is formed such that each of the two skin material fragments constituting the second overlapping part has a third part satisfying the following condition (4) and a fifth part satisfying the following condition (5):

(4) the respective third parts of the two skin material fragments being welded to be in contact with each other and parts of the respective third parts of the two skin material fragments being crushed, (5) the respective fourth parts in the two skin material fragments being adjacent to the third parts and the fourth parts being separated from each other such that a gap between the fourth parts decreases as the third part is approached.

10. The conveyance seat according to claim 2, wherein a welded portion is formed in the tarpaulin, the welded portion being recessed.

11. The conveyance seat according to claim 10, wherein the welded portion is disposed on a first cushion material piece side of the overlapping part.

12. The conveyance seat according to claim 2, wherein the second cushion material piece has a recess on a surface side of the second cushion material piece, and a space is provided between the second cushion material piece and the skin material.

13. The conveyance seat according to claim 2, further comprising a base material on which the cushion material is placed, wherein a plurality of projections projecting towards the seating surface side are provided on the base material.

14. The conveyance seat according to claim 13, wherein the plurality of projections extend in a vertical direction.

15. The conveyance seat according to claim 13, wherein the plurality of projections include projections that have different projection amounts.

* * * * *